(12) United States Patent
Dieckhoff

(10) Patent No.: US 9,765,849 B2
(45) Date of Patent: Sep. 19, 2017

(54) TORSIONAL VIBRATION DAMPING ARRANGEMENT FOR THE DRIVE TRAIN OF A VEHICLE

(71) Applicant: ZF FRIEDRICHSHAFEN AG, Friedrichshafen (DE)

(72) Inventor: Tobias Dieckhoff, Würzburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 59 days.

(21) Appl. No.: 14/764,943

(22) PCT Filed: Jan. 9, 2014

(86) PCT No.: PCT/EP2014/050288
§ 371 (c)(1),
(2) Date: Jul. 30, 2015

(87) PCT Pub. No.: WO2014/117978
PCT Pub. Date: Aug. 7, 2014

(65) Prior Publication Data
US 2015/0377321 A1 Dec. 31, 2015

(30) Foreign Application Priority Data
Jan. 31, 2013 (DE) .................. 10 2013 201 619

(51) Int. Cl.
*F16H 45/02* (2006.01)
*F16F 15/14* (2006.01)
(Continued)

(52) U.S. Cl.
CPC .... *F16F 15/1478* (2013.01); *F16F 15/13157* (2013.01); *F16H 45/02* (2013.01);
(Continued)

(58) Field of Classification Search
CPC ............ F16H 45/02; F16H 2045/0268; F16H 2045/0221; F16H 2045/007; F16F 15/1478; F16F 15/13157
(Continued)

(56) References Cited

U.S. PATENT DOCUMENTS 4,334,112 A * 6/1982 Lee .................... C07C 17/12
570/207
4,382,393 A * 5/1983 Bowen ............ F16H 47/085
475/47
(Continued)

FOREIGN PATENT DOCUMENTS

DE 94 14 314 11/1994
DE 10 2007 032 678 1/2009
(Continued)

*Primary Examiner* — Roger Pang
(74) *Attorney, Agent, or Firm* — Cozen O'Connor

(57) ABSTRACT

A torsional vibration damping arrangement for the drivetrain of a vehicle has an input region driven in rotation around an axis of rotation A and an output region. A first torque transmission path and a second torque transmission path parallel thereto proceed from the input region. A coupling arrangement communicates with the output region for superposing the torques guided via the torque transmission paths, and a phase shifter arrangement for the first torque transmission path generates a phase shift of rotational irregularities guided via the first torque transmission path relative to rotational irregularities guided via the second torque transmission path. The output region includes the planet gear carrier at which a planet gear is rotatably supported, and the planet gear carrier is connected to the output region to be fixed with respect to rotation relative to it.

7 Claims, 9 Drawing Sheets

(51) Int. Cl.
*F16F 15/131* (2006.01)
*F16H 45/00* (2006.01)

(52) U.S. Cl.
CPC ............. *F16H 2045/007* (2013.01); *F16H 2045/0221* (2013.01); *F16H 2045/0268* (2013.01)

(58) Field of Classification Search
USPC ................................. 475/36, 53, 59, 338
See application file for complete search history.

(56) References Cited

U.S. PATENT DOCUMENTS

| | | | | |
|---|---|---|---|---|
| 4,889,012 A | * | 12/1989 | Dull | ............ F16H 45/02 192/3.28 |
| 5,634,866 A | | 6/1997 | Sudau | |
| 5,863,274 A | * | 1/1999 | Jackel | ............ F16F 15/13157 192/70.17 |
| 9,151,373 B2 | * | 10/2015 | Dogel | ............ F16F 15/1478 |
| 2002/0033310 A1 | * | 3/2002 | Sasse | ............ F16H 45/02 192/3.29 |
| 2013/0068580 A1 | * | 3/2013 | Doegel | ............ F16F 15/1478 192/3.28 |

FOREIGN PATENT DOCUMENTS

| | | | | |
|---|---|---|---|---|
| DE | 10 2011 007 118 | | 12/2011 | |
| DE | 10 2011 007 116 | | 10/2012 | |
| JP | WO 2016047660 A1 | * | 3/2016 | ............ F16F 15/134 |

\* cited by examiner

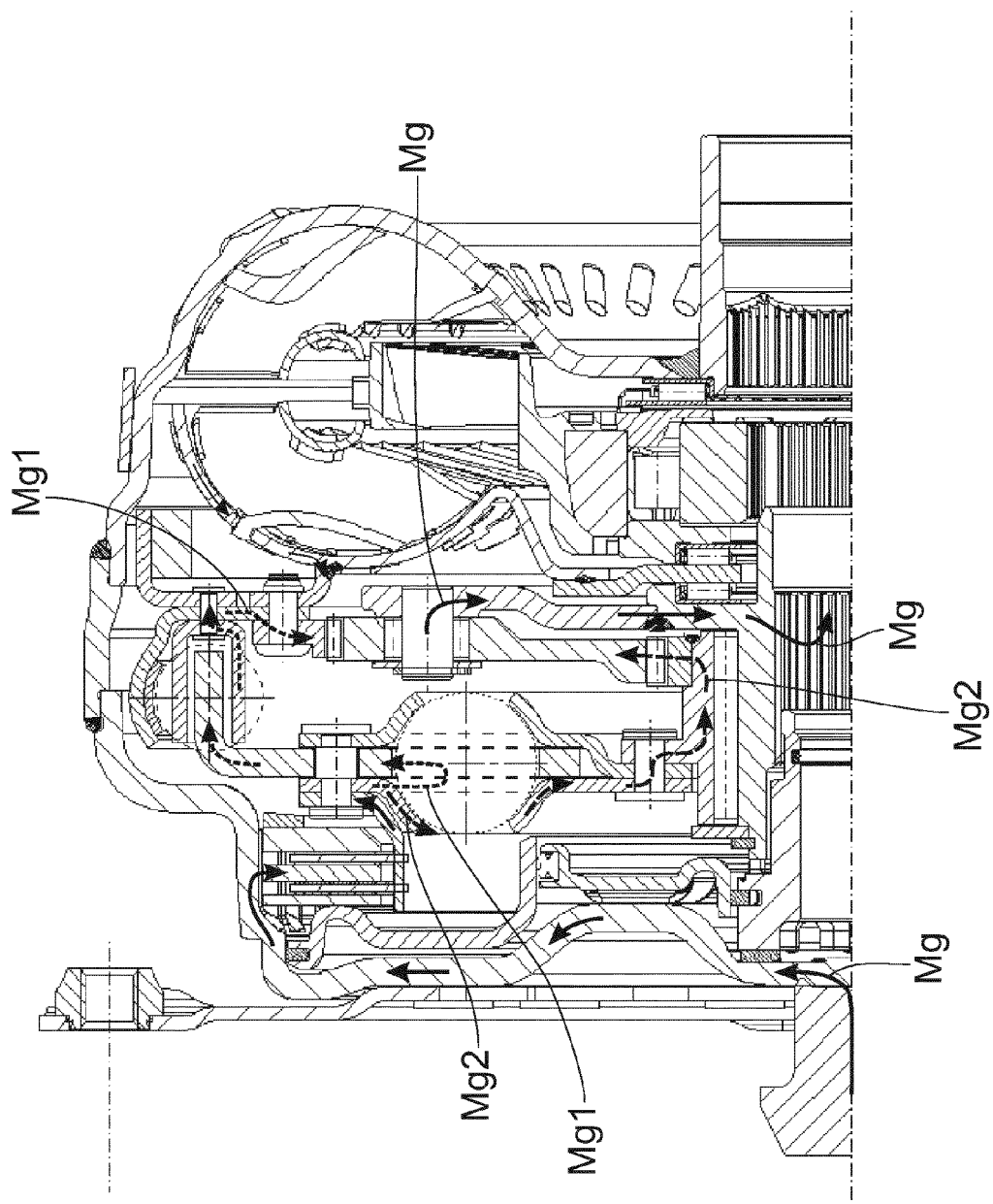

TORSIONAL VIBRATION DAMPING ARRANGEMENT FOR THE DRIVE TRAIN OF A VEHICLE

CROSS REFERENCE TO RELATED APPLICATIONS

This is a U.S. national stage of application No. PCT/EP2014/050288, filed on Jan. 9, 2014. Priority is claimed on German Application No. DE102013201619.0, filed Jan. 31, 2013, the content of which is incorporated herein by reference.

BACKGROUND OF THE INVENTION

1. Field of the Invention

The present invention is directed to a torsional vibration damping arrangement for a drivetrain of a vehicle, having an input region driven in rotation around an axis of rotation and an output region. Provided between the input region and the output region are a first torque transmission path and parallel thereto a second torque transmission path and a coupling arrangement for superposing the torques guided via the torque transmission paths. A phase shifter arrangement is provided in the first torque transmission path for generating a phase shift of rotational irregularities guided via the first torque transmission path relative to rotational irregularities guided via the second torque transmission path.

2. Detailed Description of Prior Art

A generic torsional vibration damping arrangement known from German Patent Application DE 10 2011 007 118 A1 divides the torque introduced into an input region through a crankshaft of a drive unit, into a torque component transmitted via a first torque transmission path and a torque component guided via a second torque transmission path. Not only is there a static torque divided in this torque division, but the vibrations and rotational irregularities which are generated by the periodically occurring ignitions in a drive unit and contained in the torque to be transmitted are also divided proportionately into the two torque transmission paths. The torque components transmitted via the two torque transmission paths are brought together again in a coupling arrangement which can be constructed as a planetary gear set with a planet gear carrier and are then introduced as a total torque into the output region a friction clutch or the like.

A phase shifter arrangement having an input element and an output element is provided in at least one of the torque transmission paths. This phase shifter arrangement is constructed in the manner of a vibration damper, i.e., has a primary side and a secondary side rotatable with respect to the primary side through the compressibility of a spring arrangement. In particular when this vibration system passes into a supercritical state, i.e., when it is excited with vibrations exceeding the resonant frequency of the vibration system, a phase shift of up to 180° occurs. This means that at maximum phase displacement the vibration components proceeding from the vibration system are shifted in phase by 180° with respect to the vibration components received by the vibration system. Since the vibration components guided via the other torque transmission path do not undergo a phase shift or, if so, a different phase shift, the vibration components which are contained in the unified torque components and which are then shifted in phase with respect to one another are destructively superposed on one another such that, ideally, the total torque introduced into the output region is a static torque which contains essentially no vibration components.

SUMMARY OF THE INVENTION

It is an object of the present invention to further develop a torsional vibration damping arrangement in such a way that it has a further improved vibration damping behavior and occupies a small axial installation space.

According to one embodiment of the invention, a torsional vibration damping arrangement for the drivetrain of a vehicle, comprises an input region to be driven in rotation around an axis of rotation A and an output region, wherein there are provided between the input region and the output region a first torque transmission path and parallel thereto a second torque transmission path, and a coupling arrangement communicating with the output region for superposing the torques guided via the torque transmission paths, and wherein a phase shifter arrangement is provided in the first torque transmission path for generating a phase shift of rotational irregularities guided via the first torque transmission path relative to rotational irregularities guided via the second torque transmission path. The output region comprises a planet gear carrier at which a planet gear is rotatably supported, and the planet gear carrier is connected to the output region so as to be fixed with respect to rotation relative to it.

The spring arrangement of the phase shifter arrangement can comprise at least one spring set, which advantageously comprises a coil spring. When at least two spring sets are used, these two spring sets can be arranged so as to operate in parallel or in series.

The torque which can come from an output of a drive unit, for example, a crankshaft, can be divided and transmitted by the torsional vibration damping arrangement in a manner described in the following.

When a torque runs in axial direction around the axis of rotation A from the input region to the output region, the spring set is acted upon in the first torque transmission path by a first torque via the primary mass. The first torque proceeds from the spring set via an output element to a drive ring gear connected to the output element so as to be fixed with respect to rotation relative to it and which meshes with the planet gear. The planet gear is rotatably supported on a planet gear carrier, this planet gear carrier being connected to the output region so as to be fixed with respect to rotation relative to it.

In the second torque transmission path, the second torque reaches a drive sun gear connected to the input region to be fixed with respect to rotation relative to it. The drive sun gear meshes with the planet gear. Consequently, the first torque and second torque are reunited at the planet gear. Due to the fact that the first torque undergoes a phase shift by the phase shifter arrangement in the first torque transmission path, the phase-shifted first torque and the second torque, which is not phase-shafted, are ideally destructively superposed at the planet gear such that the torsional vibrations, which can come from the drive unit of an internal combustion engine, are compensated by the superposition and a torque without torsional vibrations can be guided further to the output sun gear that meshes with the planet gear. Accordingly, the torsional vibration that is present in the torque in the input region of the torsional vibration damping arrangement is compensated in that the torque is split into a first torque and a second torque and, therefore, into two torque transmission paths, in that the phase is shifted by the phase shifter arrangement in the first torque transmission path, in that the torque is conveyed in the second torque transmission path without being phase-shifted, and the first torque and second torque are destructively superposed in the coupling arrangement, and ideally a torque without torsional vibrations reaches the output region and, therefore, arrives at, e.g., a friction clutch, a converter or the like structural component part.

In an advantageous embodiment, the coupling arrangement comprises a first input part and a second input part into which torques guided via the first torque transmission path and second torque transmission path are introduced and a superposition unit in which the introduced torques are combined again and an output part which conveys the combined torque, for example, to a friction clutch. The first input part is connected in operative direction thereof to the phase shifter arrangement on one side and to the superposition unit on the other side. The second input part is connected in operative direction thereof to the input region on one side and to the superposition unit on the other side. The superposition unit is in turn connected in operative direction thereof to both the first input part and second input part on one side and to the output part on the other side. The output part forms the output region and can receive a friction clutch in an advantageous embodiment.

To achieve the phase shift in a simple manner in one of the torque transmission paths, it is suggested that the phase shifter arrangement comprises a vibration system with a primary mass and a secondary mass that is rotatable with respect to the primary mass around the axis of rotation A against the action of a spring arrangement. A vibration system of this type can be constructed as a kind of vibration damper, known per se, in which the resonant frequency of the vibration system can be adjusted in a defined manner, particularly by influencing the primary-side mass and secondary-side mass as well as the stiffness of the spring arrangement, and the frequency at which there is a transition to the supercritical state can accordingly also be determined.

In a further advantageous embodiment form, the planetary gear set has a drive sun gear and a drive ring gear. The drive sun gear is connected to the primary mass to be fixed with respect to rotation relative to it, the drive ring gear is connected to an intermediate element so as to be fixed with respect to rotation relative to it, and the drive sun gear and drive ring gear mesh with the planet gear. The intermediate element is connected to the output element of the phase shifter arrangement so as to be fixed with respect to rotation relative to it. As a result of this embodiment form, the coupling arrangement can be constructed in an axially compact manner because the drive sun gear and the drive ring gear can be arranged in an axially overlapping manner.

In a further advantageous embodiment, the planet gear has at least a first toothing diameter and a second toothing diameter, these toothing diameters are arranged to be axially staggered, and the drive ring gear meshes with the first toothing diameter, and the drive sun gear meshes with the second toothing diameter. An installation space in which the drive ring gear and drive sun gear cannot lie on an axial plane for reasons of installation space can be taken into account with this embodiment form. This may be the case, for example, when the phase shifter arrangement lies in the radially inner region of the axial plane on which the drive ring gear is positioned.

In a further advantageous embodiment, the first toothing diameter and second toothing diameter are constructed differently. By this embodiment, the transmission ratios between the first torque transmission path and the second torque transmission path can be configured more variably, which can have an advantageous effect on the configuration of the torsional vibration damping arrangement as a whole and can offer advantages with respect to installation space.

A further advantageous embodiment form provides that the planet gear has at least a first toothing segment and a second toothing segment which at least partially axially overlap. Due to the fact that the teeth are not arranged over 360 angular degrees but rather only as segments, i.e., as partial regions, the mass can be reduced in the region of the toothing, which can have a positive effect on decoupling quality and, therefore, on the phase shifting of the torsional vibrations. This assumes that the twist angle of the planet gear is sufficiently small to allow the teeth of the planet gear to still mesh with mating teeth at a maximum twist angle of the planet gear.

In a further advantageous embodiment, the first toothing segment and second toothing segment have a different toothing diameter. As a result of this embodiment form, the drive ring gear can mesh, for example, on an axial plane with a toothing diameter of the planet gear different than the drive sun gear. However, this is only possible when the twist angle of the planet gear is sufficiently small to allow the teeth of the planet gear to still mesh with mating teeth at a maximum twist angle of the planet gear. Accordingly, depending on the required transmission ratio, the drive ring gear can mesh with a toothing diameter of the planet gear different than the drive sun gear, although both toothing diameters are positioned on the same axial plane and have the same center axis B. This allows a space-saving construction in axial and radial direction. Further, no tilting moments occur around the center axis B of the planet gear because of the different toothing diameters lying in an axial plane. This removes load from the bearing support of the planet gear and the toothing of the planet gear.

In a further advantageous embodiment, the drive ring gear meshes with the first toothing segment of the planet gear and the drive sun gear meshes with the second toothing segment of the planet gear. In this respect, as was already mentioned, the at least two toothing segments are located on the planet gear in an at least partially axially overlapping manner.

A further advantageous embodiment provides that the planet gear has at least a first toothing segment and a second toothing segment, wherein the first toothing segment and second toothing segment are arranged so as to be axially staggered. Because of the installation space, it may be that the at least two toothing segments of the planet gear cannot be arranged in an axial plane. Additional installation space can be provided by the axial staggering of the toothing diameters.

In a further advantageous embodiment, the first toothing segment and second toothing segment have a different toothing diameter. Additional installation space can be gained through this embodiment form. For example, if the first toothing diameter is configured with only 90 angular degrees on the radially outer side and the second toothing diameter is configured with only 90 angular degrees on the radially inner side and if the twist angle of the planet gear is 45 angular degrees in each direction, an installation space of 180 angular degrees around the center axis B can be obtained for other structural component parts, for example, for the component parts of the phase shifter arrangement, in the respective region in which the toothing is not present.

In a further advantageous embodiment, the drive ring gear meshes with the first toothing diameter and the drive sun gear meshes with the second toothing diameter. In this respect, as was already mentioned, the at least two different toothing diameters are located on the planet gear so as to be axially staggered.

In a further advantageous embodiment, the intermediate element comprises an additional mass. The positioning of the additional mass at the intermediate element can be particularly advantageous for decoupling quality. The additional mass must be tuned to the total system.

In a further advantageous embodiment, the phase shifter arrangement and the coupling arrangement are at least partially received in a wet space which is at least partially filled with a fluid. The wet space at least partially comprises an inner region of the torsional vibration damping arrangement. The wet space can be bounded outwardly by at least one element forming a housing portion, e.g., the primary mass and a cover plate on the transmission side. Sealing is preferably carried out by sealing elements in the radially inner region around the axis of rotation A in order to achieve reduced friction at the sealing elements caused by elements through a reduced friction diameter at the sealing elements. Positioning of the sealing elements can preferably be selected such that the torsional vibration damping arrangement can be screwed, e.g., to the crankshaft of the drive unit, through a through-hole radially inside of the sealing elements by means of at least one crankshaft screw. This is advantageous with respect to mounting the torsional vibration damping arrangement at the drive unit. The wet space can preferably be filled at least partially with a lubricant such as oil or grease in order to minimize wear and friction.

BRIEF DESCRIPTION OF THE DRAWINGS

Preferred embodiment examples of the invention will be described in the following with reference to the accompanying drawings. The drawings show:

FIG. 7a is a torque path with the converter clutch closed; and

DETAILED DESCRIPTION OF THE PRESENTLY PREFERRED EMBODIMENTS

Figure 1:
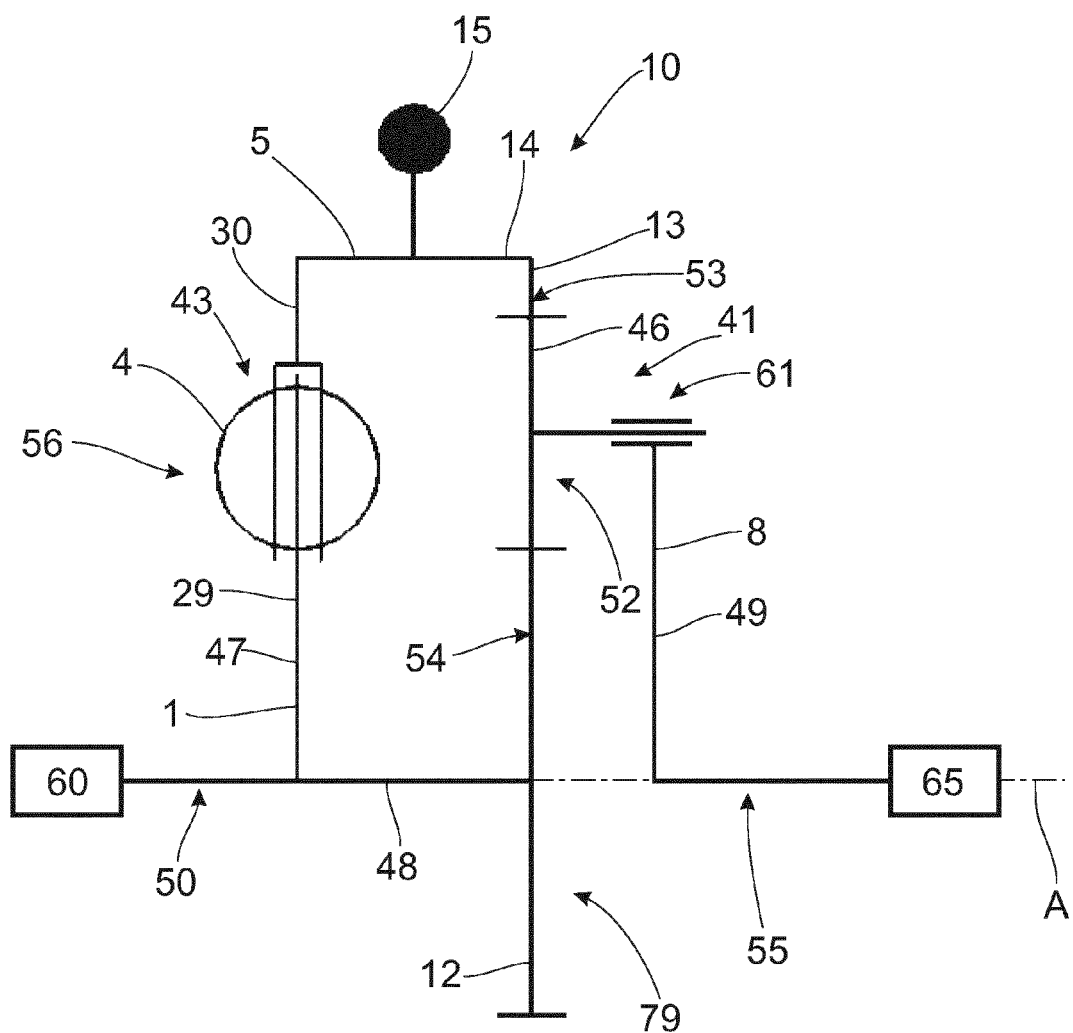
FIG. 1 is a torsional vibration damping arrangement with a planetary gear set as a coupling arrangement, wherein the output region forms the planet gear carrier.

A torsional vibration damping arrangement 10 operates on the principle of power splitting or torque splitting is rotatable around the axis of rotation A is shown schematically in FIG. 1. The torsional vibration damping arrangement 10 can be arranged in a drivetrain of a vehicle between a drive unit 60 and the subsequent portion of the drivetrain, i.e., for example, a start-up element 65 such as a friction clutch, a hydrodynamic torque converter, or the like.

The torsional vibration damping arrangement 10 comprises an input region, designated generally by 50. In the input region 50, the torque received from the drive unit 60 branches into a first torque transmission path 47 and a second torque transmission path 48. In the region of a coupling arrangement which is designated generally by reference numeral 41 and formed in this instance by a planetary gear set 61 with a planet gear 46, the torque components which are guided via the two torque transmission paths 47, 48 are introduced into the coupling arrangement 41 by means of a first input part 53 which is formed in this instance by a drive ring gear 13 and a second input part 54 which is formed in this instance by a drive sun gear 12 and are combined again therein. The planet gear 46 meshes with the drive sun gear 12 on the one hand and with the drive ring gear 13 on the other hand. The planet gear 46 is rotatably supported on a planet gear carrier 8. The planet gear carrier 8 forms an output part 49 at which a friction clutch or other start-up element, not shown, can be arranged.

A vibration system, designated generally by reference numeral 56, is integrated in the first torque transmission path 47. The vibration system 56 acts as a phase shifter arrangement 43 and comprises a primary mass 1 connected to the drive unit 60 and a spring arrangement 4 which is connected to the primary mass 1. An output element 30 of the spring arrangement 4, is further connected to an intermediate element 5, which is connected in turn to the drive ring gear 13 so as to be fixed with respect to rotation relative to it.

A torque path in the first torque transmission path 47 can run from the drive unit 60 via the primary mass 1 into the spring arrangement 4. The first torque is guided from the spring arrangement 4 via the output element 30 and intermediate element 5 to the drive ring gear 13. The output element 30, intermediate element 5 and drive ring gear 13 are connected to one another so as to be fixed with respect to rotation relative to one another. The drive ring gear 13 meshes with the planet gear 46 of the coupling arrangement 41.

In the second torque transmission path 48, the second torque is guided from the drive unit 60 into a drive sun gear 12 which is connected to the latter so as to be fixed with respect to rotation relative to it. The drive sun gear 12 meshes with the planet gear 46 and accordingly guides the second torque to the planet gear 46 of the coupling arrangement 41.

Consequently, the first torque and second torque arrive via the two torque transmission paths 47 and 48 at the planet gear 46, where they are combined. The combined torque is accordingly guided via the planet gear 46 into the planet gear carrier 8 and, therefore, to the output region 55 at which the start-up element 65, for example, a start-up clutch or the like start-up element, not shown, can be arranged.

Due to the fact that the drive ring gear 13 and drive sun gear 12 are positioned radially successively on an axial plane, no additional tilting moment occurs on the planet gear 46 by the introduction of the first torque and second torque at the planet gear 46. This is advantageous for the durability of the toothing and can have the result that the toothing can be constructed in a simpler manner and production can accordingly be facilitated. Further, this arrangement of the drive ring gear 13 and drive sun gear 12 on an axial plane is advantageous for a compact axial installation space. The available installation space is advantageously utilized by using the drive sun gear 12 on the radially inner side, by using the drive ring gear 13 on the radially outer side and by using the planet gear 46 between the drive sun gear 12 and the drive ring gear 13. A low mass inertia of the output part 49 can be achieved through the embodiment form shown here with the planet gear carrier 8 as output part 49. At the same time, the mass inertia is retained at the intermediate element 5, which is to be considered advantageous.

In case the mass inertia of the intermediate element 5 is not sufficient for achieving the decoupling quality, an additional mass 15 can be fastened to the intermediate element 5 so as to be fixed with respect to rotation relative to it.

This embodiment of the torsional vibration damping arrangement 10 is particularly suitable for installing in vehicles with transverse front-mounted engine because the available axial installation space is often smaller compared to longitudinally mounted engines. However, application is not limited thereto, but can also be carried out in any other vehicle installation space.

Figure 2:
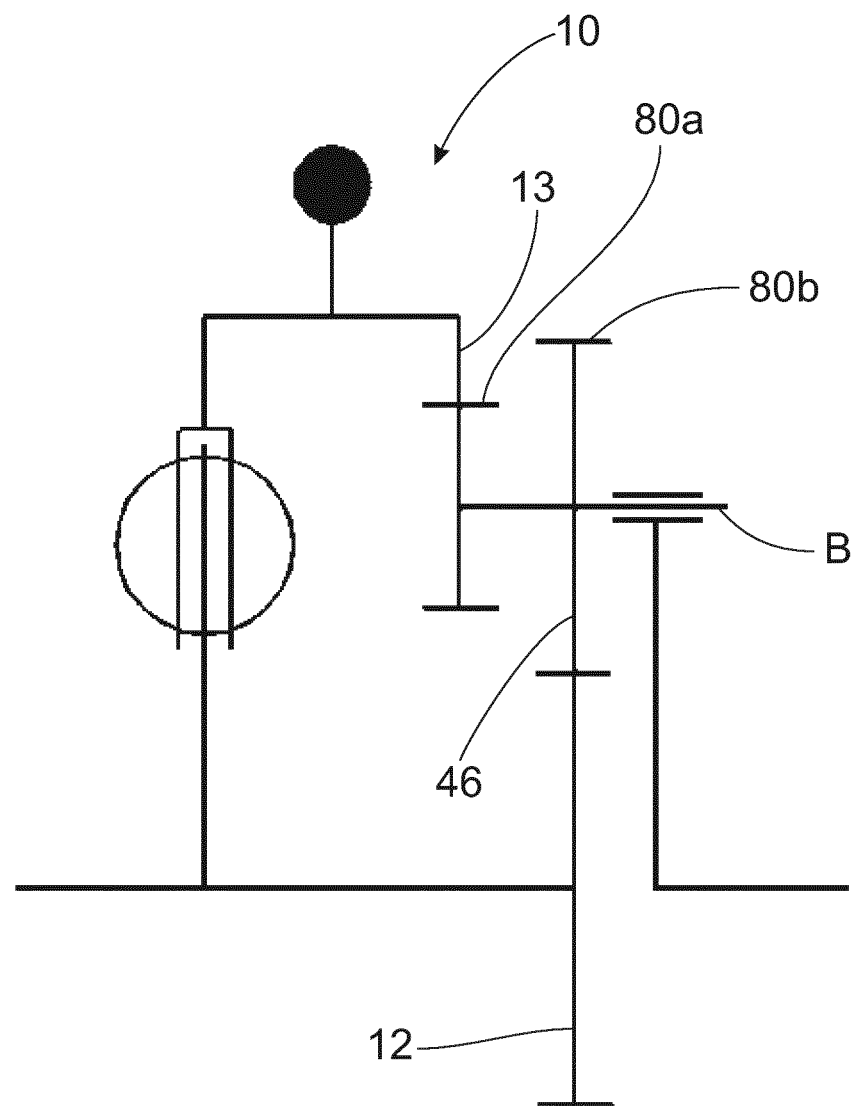
FIG. 2 is a torsional vibration damping arrangement with an axially stepped planet gear.

FIG. 2 shows a torsional vibration damping arrangement 10 like that in FIG. 1, but the planet gear 46 has two different toothing diameters 80a and 80b which are arranged in an axially staggered manner but have the same center axis B. The drive ring gear 13 meshes with the smaller toothing diameter 80a. Toothing 80b is positioned at an axial distance from toothing 80a. Although it is not shown here, it is also possible that the toothing diameters 80a and 80b are arranged in such a way that they do not touch one another axially. The drive sun gear 12 meshes with the larger toothing diameter 80b. As a result of this embodiment form, the drive ring gear 13 can mesh with a toothing diameter of the planet gear 46 different than the drive sun gear 12. This can be particularly advantageous because the required gear ratios can be realized in a more radially compact manner as a result of this arrangement.

Figure 3:
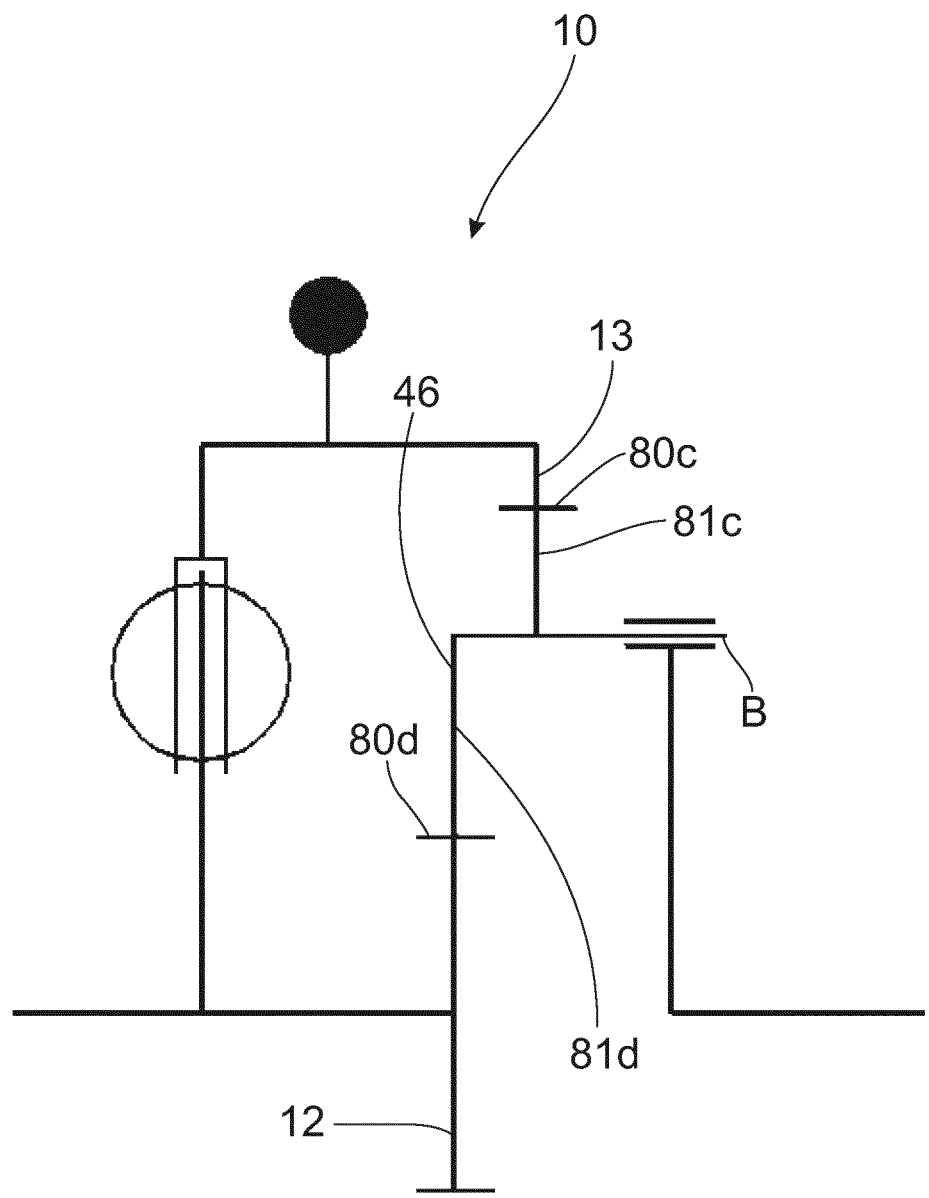
FIG. 3 is a torsional vibration damping arrangement with two different toothing diameters which are formed in each instance as toothing segments.

FIG. 3 shows a torsional vibration damping arrangement 10 like that in FIG. 2, but the different toothing diameters 80c and 80d are carried out in each instance with less than 360 angular degrees and can be referred to as toothing segments 81c and 81d. The center axis B of toothing segment 81c and toothing segment 81d is identical. In the depicted arrangement, toothing segment 81c is carried out with 180 angular degrees and toothing segment 81d is also carried out with 180 angular degrees. However, the angular degrees of toothing segments 81c and 81d may deviate from these values. Different angular degrees are also possible in toothing segments 81c and 81d. The decisive criterion for the amount of angular degrees with which to carry out toothing segments 81c and 81d can be a maximum twist angle of the planet gear 46. The drive ring gear and drive sun gear must be able to mesh with the planet gear at the maximum twist angle of the planet gear 46. Reducing the angular degrees of the toothing segments 81c and 81d also makes it possible to economize on mass. Further, an additional installation space can be obtained in the region where the toothing is not carried out. Further, fabrication of teeth with less than 360 angular degrees may be less expensive and, therefore, can be considered as advantageous.

Figure 4:
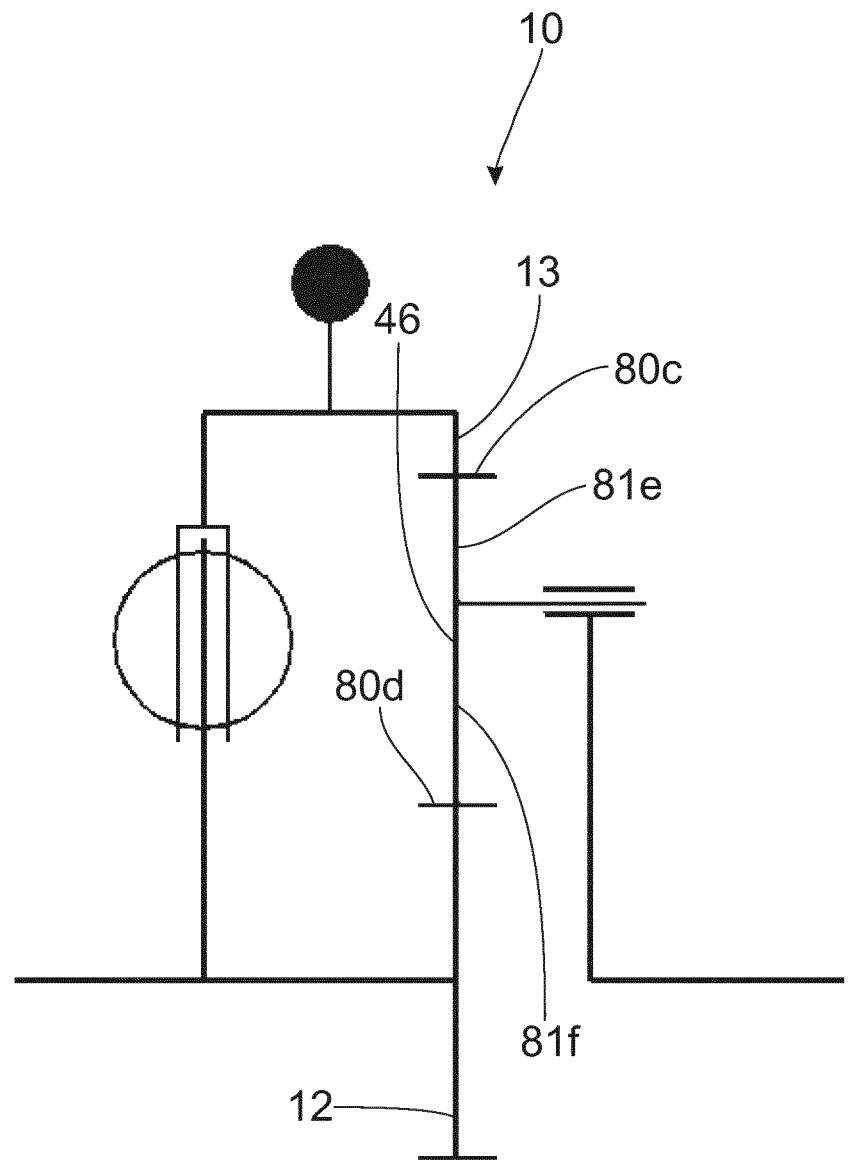
FIG. 4 is a torsional vibration damping arrangement with a planet gear that comprises two toothing segments on the same axial plane.

FIG. 4 shows a torsional vibration damping arrangement 10 like that in FIG. 3, but with two toothing segments 81e and 81f lying on an axial plane in this case. It is also possible, although not shown here, that the toothing segments 81e and 81f axially overlap only partially. In this respect, the sum of the angular degrees of the toothing segments 81e and 81f can be a maximum of 360 angular degrees. In this case also, the twist angle of the planet gear 46 and the assurance that the drive ring gear 13 and drive sun gear 12 still mesh with the planet gear 46 at the maximum twist angle of the planet gear 46 are determining factors for the utilized angular degrees of the toothing segments 81e and 81f. Due to the fact that the different toothing segments 81e and 81f lie on an axial plane, a more axially compact installation space can be achieved, although an additional gear ratio is operative between the drive sun gear 12 and the planet gear 46.

Figure 5:
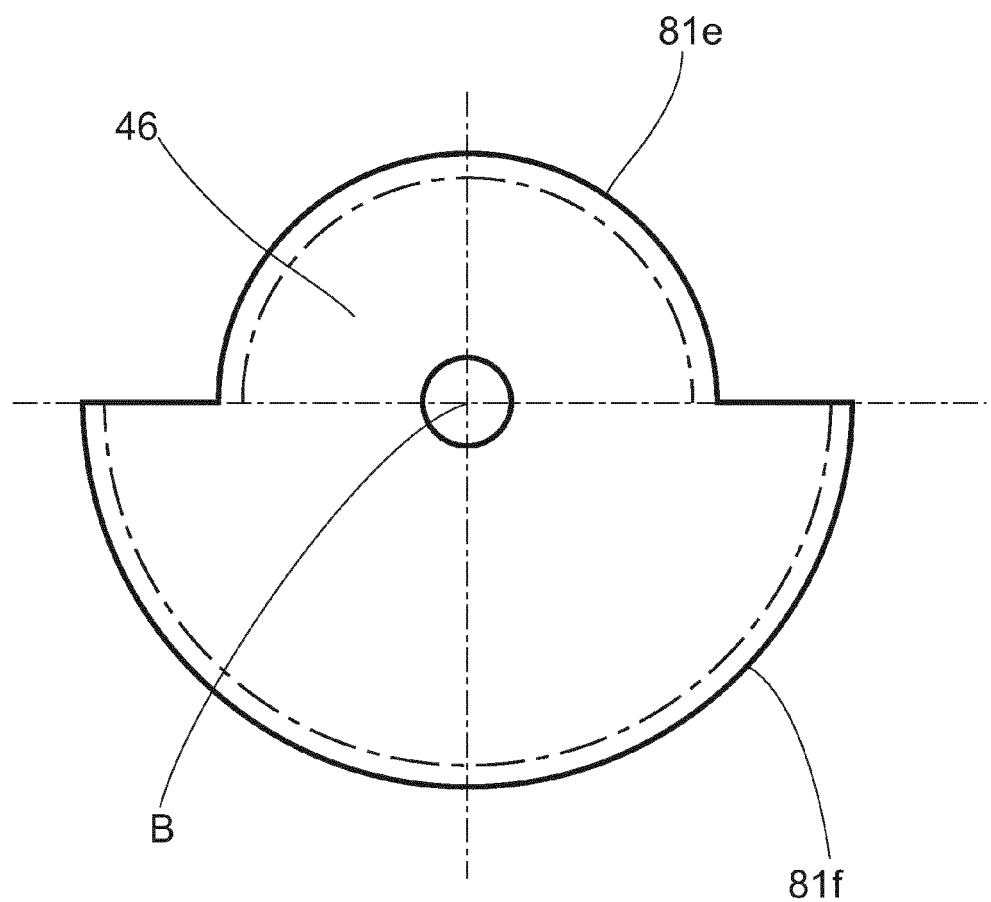
FIG. 5 is a top view of a planet gear with two different toothing diameters.

FIG. 5 shows a top view of a possible construction of a planet gear 46 with two different toothing segments 81e and 81f. The center axis B of toothing segment 81e and toothing segment 81f is identical. In the arrangement shown here, the respective toothing segment 81e and 81f is carried out with 180 angular degrees. However, although this is not shown, the toothing segments 81e and 81f can also be carried out with different angular degrees, e.g., toothing segment 81e can be carried out with 150 angular degrees and toothing segment 81e can be carried out with 210 angular degrees. The sum of the angular degrees of the toothing segments can also add up to less than 360 angular degrees, but can be at most 360 angular degrees taken together.

Figure 6:
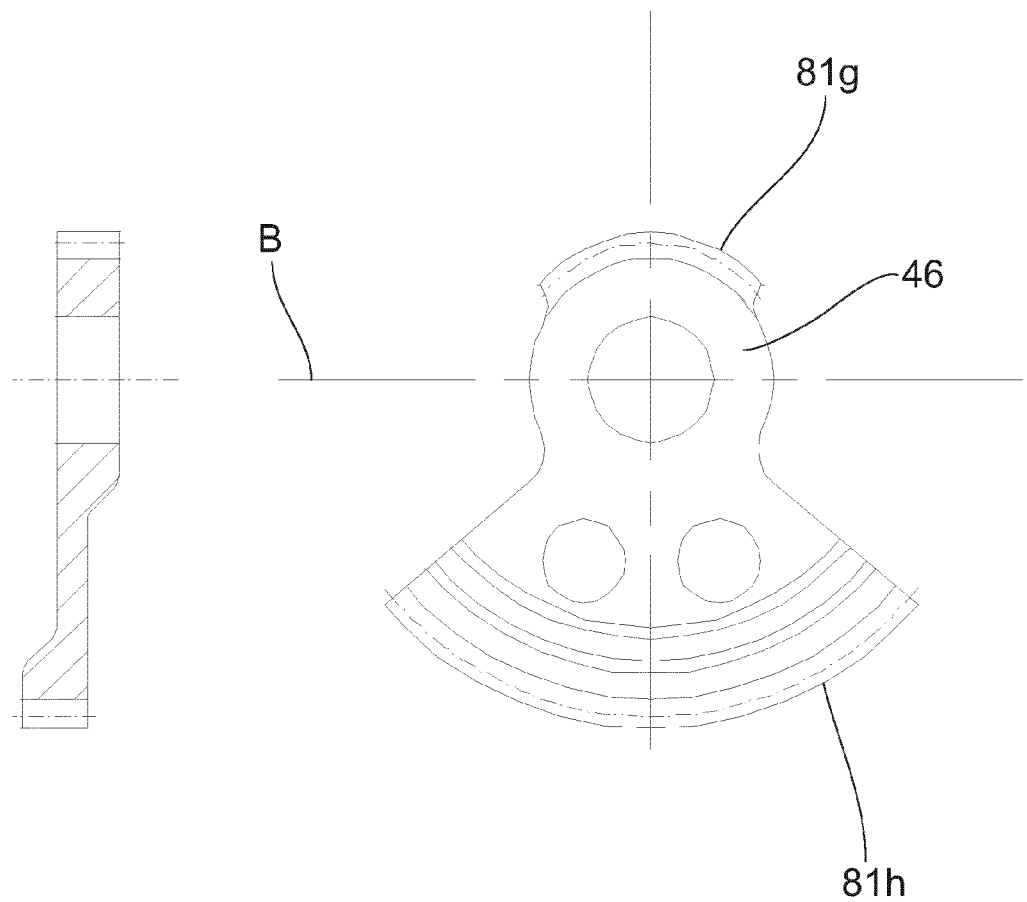
FIG. 6 is a planet gear with partially axially offset toothing segments.

A planet gear 46 with two different toothing segments 81g and 81h is shown in section and in a top view in FIG. 6. The two toothing segments 81g and 81h have the same center axis B. Toothing segment 81g is shown with about 90 angular degrees and toothing segment 81h is shown with about 100 angular degrees. The two toothing segments 81g and 81h overlap partially axially. It can be clearly seen how much mass can be saved when using toothing segments.

Figure 7:
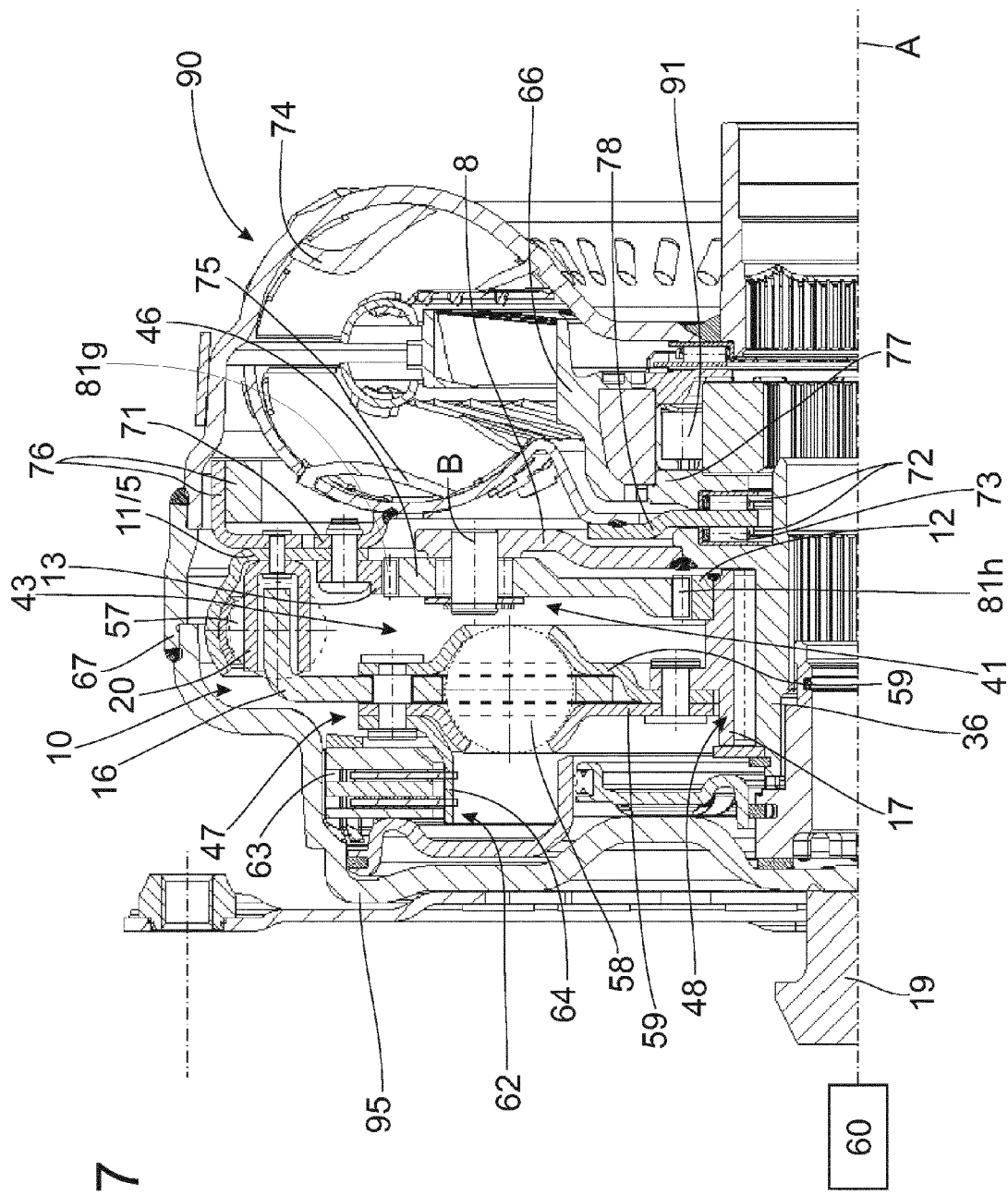
FIG. 7 is a torsional vibration damping arrangement in connection with a hydrodynamic torque converter.
Figure 7B:
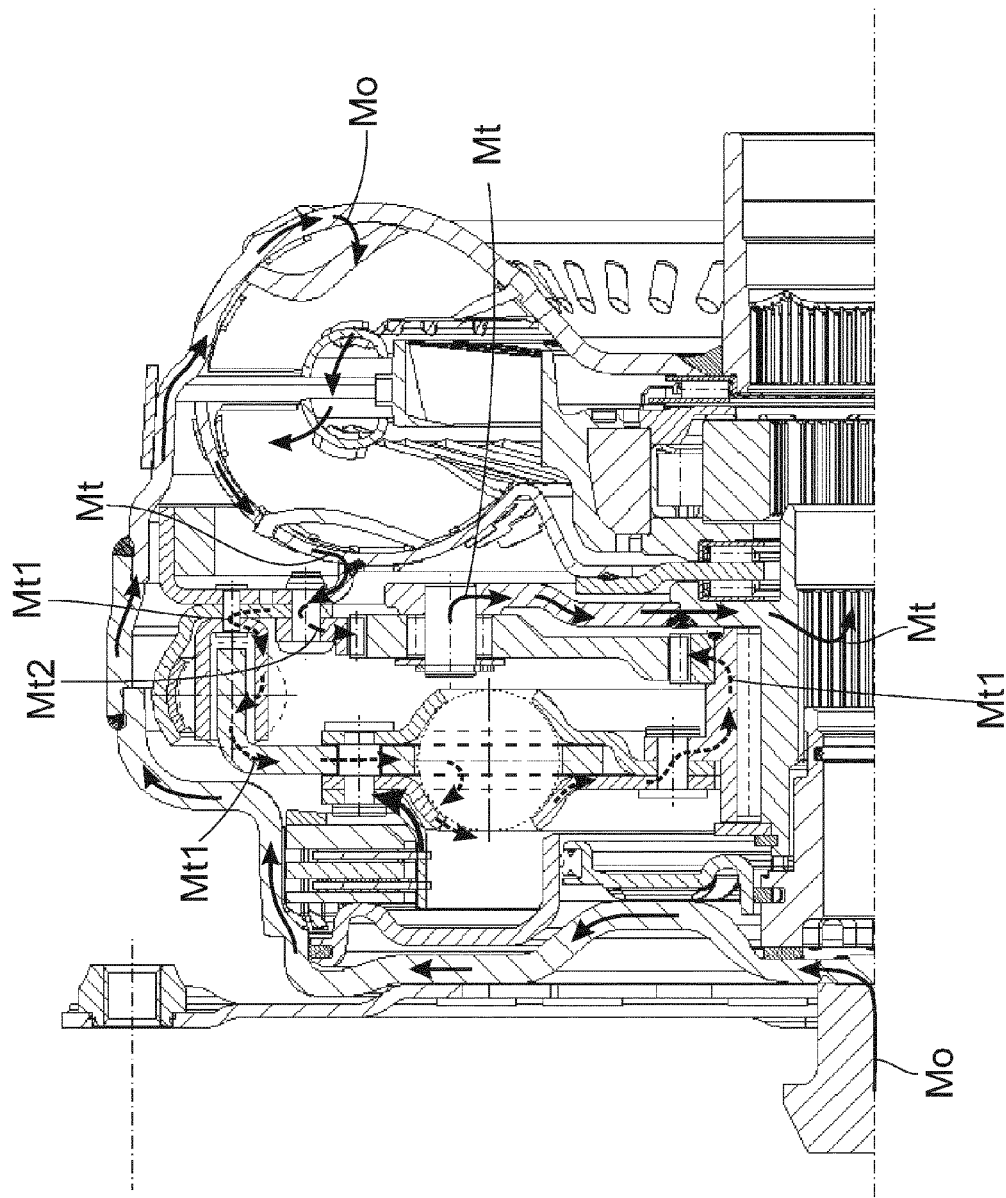
FIG. 7b is a torque path with the converter clutch open.

FIG. 7 shows a torsional vibration damping arrangement on the same principle as that in FIG. 4 as an application in connection with a hydrodynamic torque converter 90. This primarily comprises the torque converter 90 with a converter clutch 62 and the torsional vibration damping arrangement 10. The torsional vibration damping arrangement 10 in this instance preferably also includes a first torque transmission path 47 and second torque transmission path 48, a phase shifter arrangement 43 and a coupling arrangement 41. For a clearer illustration, FIG. 7a shows a torque path with closed converter clutch 62 and FIG. 7b shows a torque path with open converter clutch 62. FIGS. 7a and 7b are to be viewed with reference to the descriptions in FIG. 7.

In a closed converter clutch 62 with the torque path shown in FIG. 7a, a total torque Mg which can come from a drive unit 60, for example, an internal combustion engine, arrives at a converter housing 95 via a crankshaft 19. Further, the total torque Mg is guided into the converter clutch 62 via a converter clutch drive 63. Because of the closed converter clutch 62, the total torque Mg is guided via a converter clutch output 64 into the torsional vibration damping arrangement 10, in this case at a guide plate 59 which is connected to the converter clutch output 64 so as to be fixed with respect to rotation relative to it. From the guide plate 59, the total torque Mg is divided into a first torque Mg1 and a second torque Mgt. The first torque Mg1 passes from the guide plate 59 to an inner spring set 58. The first torque Mg1 is guided from the inner spring set 58 via a hub disk 16 to an outer spring set 57. From the outer spring set, the first torque Mg1 passes via a stop element 20 and an intermediate element 5, constructed in this instance as a drive ring gear carrier 11 and connected to the stop element 20 to be fixed with respect to rotation relative to it, to a drive ring gear 13 connected to the drive ring gear carrier 11 to be fixed with respect to rotation relative to it. The drive ring gear 13 meshes with a toothing segment 81g of a planet gear 46 and guides the first torque Mg1 to the planet gear 46.

The second torque Mg2 passes via the guide plate 59 to a drive sun gear carrier 17 connected to the guide plate 59 to be fixed with respect to rotation relative to it. A drive sun gear 12 is connected to the drive sun gear carrier 17 so as to be fixed with respect to rotation relative to it. However, the drive sun gear carrier 17 and the drive sun gear 12 can also be produced as one structural component part. Consequently, the second torque Mg2 is guided further to the drive sun gear 12. The drive sun gear 12 meshes with a toothing segment 81*h* of the planet gear 46 and accordingly guides the second torque Mg2 to the planet gear 46. Accordingly, the first torque Mg1 and the second torque Mg2 are guided together again at the planet gear 46. In so doing, a vibration component in the first torque Mg1 which is guided via the first torque transmission path 47 through the phase shifter arrangement 43 is ideally phase-shifted by the phase shift by 180 degrees relative to the vibration component in the second torque Mg2 which is not guided via the phase shifter arrangement 43. Consequently, the first torque Mg1 with a vibration component that is phase-shifted by 180 degrees and the second torque Mg2 would ideally be destructively superposed at the planet gear 46 such that the total torque Mg is present at the planet gear carrier 8 without torsional vibration components. The planet gear carrier 8 is connected to an output flange 36 so as to be fixed with respect to rotation relative to it. The transmission input shaft, not shown, is in turn connected to the output flange 36 so as to be fixed with respect to rotation relative to it, and the total torque M is guided further, ideally without vibration components, to a transmission, not shown. To increase a mass moment of inertia of the intermediate element 5, which can have positive results on the phase shifting, a turbine 75 is non-rotationally connected via a support 71 which is connected to the intermediate element 5 so as to be fixed with respect to rotation relative to it.

In addition, additional masses 76 can be provided that increase the mass moment of inertia of the intermediate element 5 and which can accordingly have a positive effect on the phase shift. The turbine 75 also forms a connection to a bearing location 72 in this case. In the present illustration, an additional thrust bearing 73 is inserted between a pressure disk 77 and the output flange 36 so that a bearing disk 78, which is connected to the turbine 75 to be fixed with respect to rotation relative to it is additionally guided axially between the bearing location 22. This ensures not only an axial bearing support of a stator 66 connected to the pressure disk 77 so as to be fixed with respect to rotation relative to it, but also additionally ensures a bearing support of the turbine 75 and of the structural component parts fastened to the latter relative to the output flange 36 and relative to a freewheel 91 and the converter housing 95. A sliding bearing or a rolling element bearing constructed in a different manner are also possible. However, the bearing location 72 must substantially absorb the axial forces of the turbine 75 in converter mode and must define the axial position of the drive ring gear carrier 11. A radial bearing support of the coupling arrangement 41 is carried out via the toothing segments 81*g*, 81*h* of the planet gear 46 ("floating bearing").

A possibility that allows a stationary gear ratio required for the function of the torsional vibration damping arrangement 10 to be realized between the drive sun gear 12 and the drive ring gear 13 with a reduced radial installation space requirement consists in using the planet gear 46 with two different toothing segments 81*g* and 81*h* as is shown here. A center axis B forms the center axis for both toothing segments 81*g* and 81*h*. Further, the two toothing segments 81*g* and 81*h* partially axially overlap so that toothing segments 81*g* and 81*h* are formed in each instance with 180 angular degrees. The use of the planet gear 46 with two different partially axially overlapping toothing segments 81*g* and 81*h* is possible because a twist angle of the planet gear 46 is sufficiently small. Due to the fact that the toothing segment 81*h* meshing with the drive sun gear 12 is greater than the toothing segment 81*g* meshing with the drive ring gear 13, the amount of the stationary gear ratio increases compared to a transmission with known planet gears with identical outer dimensions. Further, to make better use of the axial installation space, the two toothing segments 81*g* and 81*h* of the planet gear 46 can be partially axially offset relative to one another as is shown.

With an open converter clutch 62 with the torque path shown in FIG. 7*b*, the total torque Mo is guided via the converter housing 95 and a connection plate 67 and further to an impeller 74. The impeller 74 is connected to the connection plate 67, preferably by a weld joint, to be fixed with respect to rotation relative to it. The connection plate 67 is in turn connected to the converter housing 95, preferably by a weld joint, to be fixed with respect to rotation relative to it. Accordingly, at the torque converter 90 the total torque Mo is present at the impeller 74. Depending on a configuration of the torque converter 90 and of the applied total torque Mo and an applied rotational speed at the impeller 74, a torque Mt is present at the turbine 75. Since the turbine 75 is connected to the drive ring gear carrier 11 to be fixed with respect to rotation relative to it, torque Mt is guided further from the turbine 75 to the drive ring gear carrier 11. From the drive ring gear carrier 11, torque Mt is split into two torque components Mt1 and Mt2. The one torque component Mt2 is present at the drive ring gear 13 connected to the drive ring gear carrier 11 so as to be fixed with respect to rotation relative to it. The other torque component Mt1 is guided via the drive ring gear carrier 11 and the stop element 20 to the outer spring set 57. This torque component Mt1 passes from the outer spring set 57 via the hub disk 16 to the inner spring set 58 and further from the inner spring set 58 via the guide plate 59 to the drive sun gear carrier 17 and, consequently, to the drive sun gear 12. Since the drive sun gear 12 and the drive ring gear 13 mesh with the planet gear 46, the two torque components Mt1 and Mt2 are guided together again at the planet gear 46. Via the planet gear carrier 8 at which the planet gear 46 is rotatably supported, the combined torque Mt is guided onward to the output flange 36 which is connected to the planet gear carrier 8, preferably by a weld joint, so as to be fixed with respect to rotation relative to it. It is also possible to construct the output flange 36 and planet gear carrier 8 as one structural component part. The combined torque Mt can be guided from the output flange 36 to a transmission, not shown, or like structural component part.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a drivetrain of a vehicle, comprising:
an input region configured to be driven in rotation around an axis of rotation;
an output region,
a first torque transmission path that proceeds from the input region;
a second torque transmission path parallel to the first torque transmission path that proceeds from the input region; and
a coupling arrangement communicating with the output region and configured to superpose respective torques guided via the first torque transmission path and the second torque transmission path, wherein the coupling arrangement comprises:
a planet gear carrier that is connected to the output region to be fixed with respect to rotation relative to the output region;
a planetary gear set having the planet gear carrier;
a phase shifter arrangement for the first torque transmission path having an input element and an output element, the phase shifter arrangement configured to generate a phase shift of rotational irregularities guided via the first torque transmission path relative to rotational irregularities guided via the second torque transmission path;
a superposition unit;
a first input part is operatively connected to the output element of the phase shifter arrangement and to the superposition unit;
a second input part is operatively connected to the input region and to the superposition unit; and
an output part that forms the output region,
wherein the superposition unit is operatively connected to both the first input part, second input part, and to the output part,
wherein the output region comprises the planet gear carrier at which a planet gear is rotatably supported,
wherein the planet gear comprises at least a first toothing with a first diameter and a second toothing with a second diameter, wherein the first and second toothings are arranged to be axially staggered, and wherein a drive ring gear meshes with the first toothing of the planet gear, and a drive sun gear meshes with the second toothing of the planet gear,
wherein the phase shifter arrangement comprises a vibration system with a primary mass and an intermediate element that is rotatable with respect to the primary mass around the axis of rotation against an action of a spring arrangement, wherein the intermediate element forms the output element of the phase shifter arrangement,
wherein the planetary gear set has the drive sun gear and the drive ring gear,
wherein the drive sun gear is connected to the primary mass to be fixed with respect to rotation relative to it, and the drive ring gear is connected to the intermediate element to be fixed with respect to rotation relative to it, and
wherein the drive sun gear and the drive ring gear mesh with the planet gear.

2. Torsional vibration damping arrangement according to claim 1, further comprising an additional mass is positioned at an intermediate element.

3. Torsional vibration damping arrangement according to claim 1, wherein the phase shifter arrangement and the coupling arrangement are at least partially received in a wet space that is at least partially filled with a fluid.

4. A torsional vibration damping arrangement for a drivetrain of a vehicle, comprising:
an input region configured to be driven in rotation around an axis of rotation;
an output region,
a first torque transmission path that proceeds from the input region;
a second torque transmission path parallel to the first torque transmission path that proceeds from the input region; and
a coupling arrangement communicating with the output region and configured to superpose respective torques guided via the first torque transmission path and the second torque transmission path, wherein the coupling arrangement comprises:
a planet gear carrier that is connected to the output region to be fixed with respect to rotation relative to the output region;
a planetary gear set having the planet gear carrier; and
a phase shifter arrangement for the first torque transmission path having an input element and an output element, the phase shifter arrangement configured to generate a phase shift of rotational irregularities guided via the first torque transmission path relative to rotational irregularities guided via the second torque transmission path,
wherein the output region comprises the planet gear carrier at which a planet gear is rotatably supported,
wherein the planet gear comprises at least a first toothing with a first diameter and a second toothing with a second diameter, wherein the first and second toothings are arranged to be axially staggered, and wherein a drive ring gear meshes with the first toothing of the planet gear, and a drive sun gear meshes with the second toothing of the planet gear,
wherein the first toothing diameter and second toothing diameter are different.

5. The torsional vibration damping arrangement according to claim 4, wherein the first toothing comprises at least a first toothing segment and the second toothing comprise a second toothing segment, wherein the first toothing segment and second toothing segment at least partially axially overlap.

6. The torsional vibration damping arrangement according to claim 5, wherein the first toothing segment and second toothing segment each have a different toothing diameter.

7. The torsional vibration damping arrangement according to claim 6, wherein the drive ring gear meshes with the first toothing segment of the planet gear and the drive sun gear meshes with the second toothing segment of the planet gear.

* * * * *